June 9, 1925.
E. R. DRAVER
1,541,413
CARRIER FOR DEMOUNTABLE RIMS
Filed March 14, 1923    2 Sheets-Sheet 1
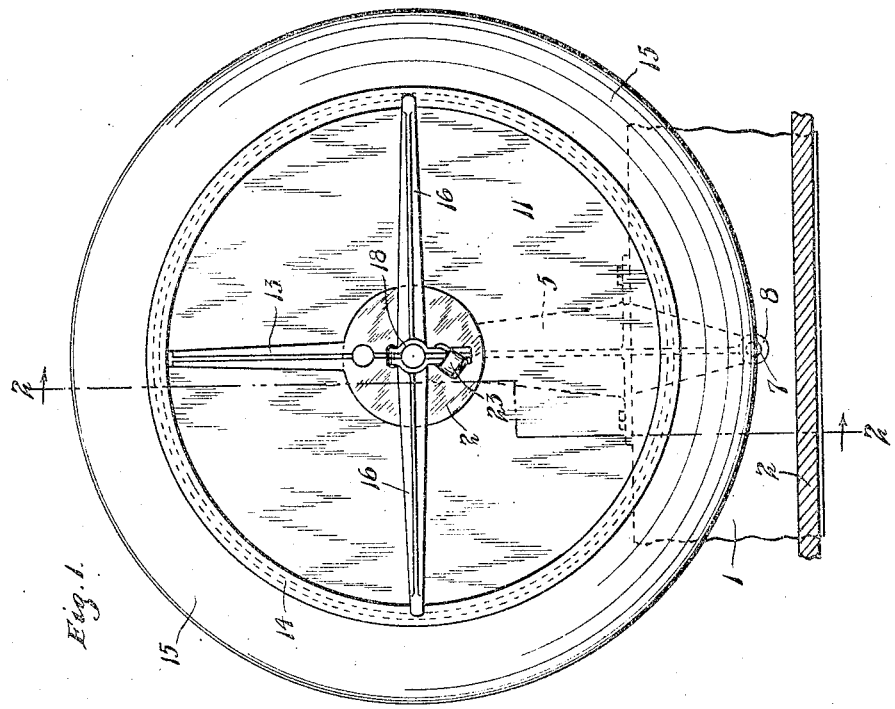
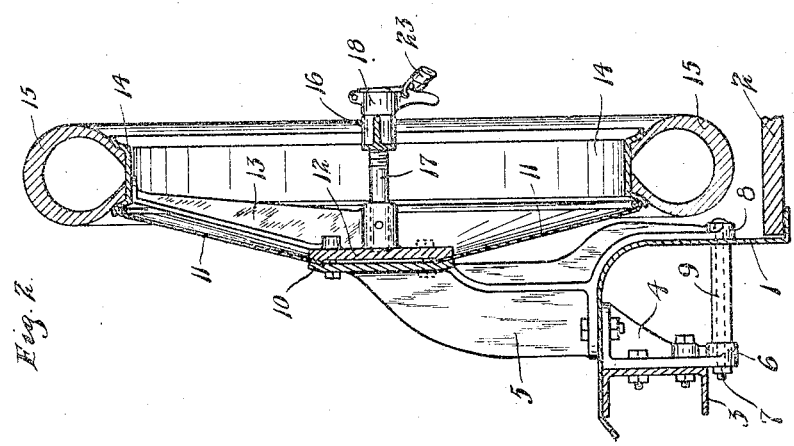
INVENTOR.
EMIL R. DRAVER.
BY HIS ATTORNEY June 9, 1925.  
E. R. DRAVER  
1,541,413  
CARRIER FOR DEMOUNTABLE RIMS  
Filed March 14, 1923   2 Sheets-Sheet 2
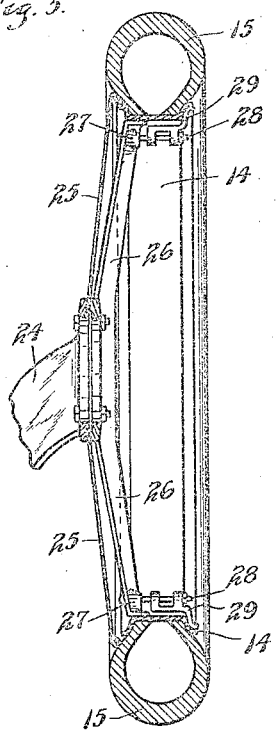
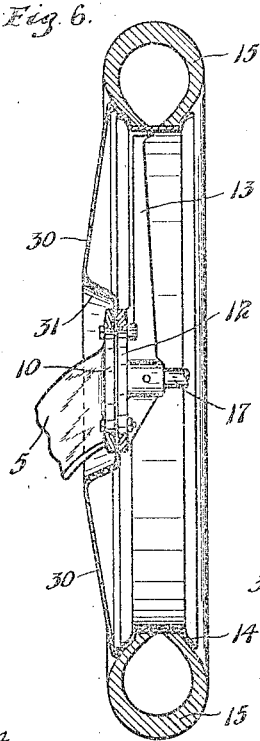
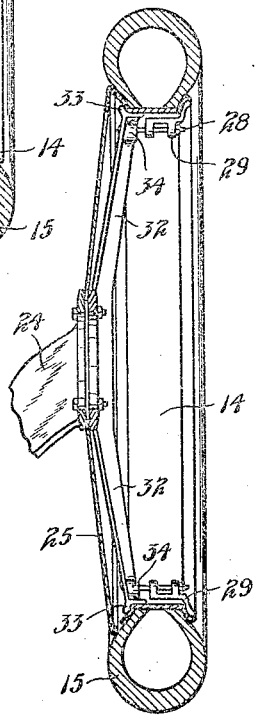
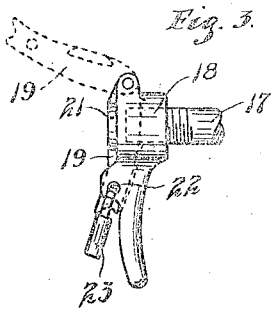
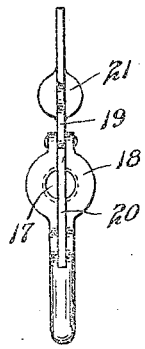
INVENTOR.  
EMIL R. DRAVER.  
BY HIS ATTORNEY.  
James F. Williamson Patented June 9, 1925.

1,541,413

UNITED STATES PATENT OFFICE.

EMIL R. DRAVER, OF RICHMOND, INDIANA, ASSIGNOR, BY DIRECT AND MESNE ASSIGNMENTS, OF ONE-FOURTH TO RICHARD E. PFENNING AND ONE-FOURTH TO EDWARD D. WRIGHT, BOTH OF BOSTON, MASSACHUSETTS, AND ONE-FOURTH TO ARTHUR WILLIS AND ONE-FOURTH TO LEWIS P. KAUFMAN, BOTH OF BOSTON, MASSACHUSETTS.

CARRIER FOR DEMOUNTABLE RIMS.

Application filed March 14, 1923. Serial No. 624,957.

*To all whom it may concern:*

Be it known that I, EMIL R. DRAVER, a citizen of the United States, residing at Richmond, in the county of Wayne and State of Indiana, have invented certain new and useful Improvements in Carriers for Demountable Rims; and I do hereby declare the following to be a full, clear, and exact description of the invention, such as will enable others skilled in the art to which it appertains to make and use the same.

This invention relates to an article carrier, and particularly to a carrier adapted to support a wheel rim such as a demountable rim for an automobile wheel, which rim may, or may not be equipped with a tire. In the modern structure and manipulation of automobile wheels it is desirable to carry extra rims, which rims are also often equipped with extra tires.

It is an object of this invention to provide such a carrier supported on a bracket attached to the automobile body, which carrier comprises means engaging the edges of the rim to clamp the same and means engaging the inner circumferential side of the rim for supporting the same.

It is a further object of the invention to provide such a carrier in which a circular disk or plate is supported on the said bracket and clamped between the same and rim supporting member, which latter member also carries means for securing a demountable rim mounted on the carrier.

It is more specifically an object of the invention to provide such a carrier in which the clamping effect on the rim is secured by a nut threaded on the end of a stem projecting from said rim supporting member, which nut and stem are provided with locking means adapted to prevent the turning and removal of said nut.

These and other objects and advantages of the invention will be fully set forth in the following description made in connection with the accompanying drawings in which like reference characters refer to the same parts throughout the different views, and in which—

Fig. 1 is a view in front elevation of the carrier and a portion of the automobile to which the same is secured;

Fig. 2 is a vertical section taken on the line 2—2 of Fig. 1;

Fig. 3 is a fragmentary view in side elevation of the locking means used;

Fig. 4 is a view in front elevation of the nut and locking member carried thereby;

Fig. 5 is a vertical section similar to Fig. 2 but showing a modified form of the device;

Fig. 6 is a similar vertical section showing a further modified form of the invention, and Fig. 7 is a central vertical section showing still another modification.

Referring to the drawings, a portion 1 of an automobile body is shown which, in the embodiment of the invention illustrated, constitutes the apron or runningboard shield or a curved portion of the body immediately above the runningboard forming a protection member for the sides of the vehicle, said runningboard being illustrated as 2. The side member of the chassis frame is illustrated as 3 and has bolted thereto behind the shield an arm or angle bracket 4 constituting a support for the carrier. An upstanding arm or bracket 5 has a flange fitting on and around the body portion 1 and an extension or arm 1ª, which flange is bolted to the top flange of the bracket 4 through said body portion, suitably alined holes or openings being made in said flanges and body portion for the purpose. The bracket 4 has a lower lug 6 and a headed and nutted bolt 7 extends through the lug 8 on the lower end of arm 1ª of bracket 5 through sleeve 9 and the lug 6 thus tightly and securely fastens the bracket 5 to the frame 3 and body 1. It is obvious that the relative positions of the brackets 4 and 5 may be adjusted to suit the alinement of the frame 3 and body 1, respectively, prior to cutting the holes through the latter and the inner bracket for securing them together, thereby preventing slight misalinement of the frame and body from interfering with the assembling or proper positioning of the carrier, and obviating cutting enlarged openings through the body for the securing bolts. The bracket 5 is of ribbed cross section and carries at its upper end a circular disk-like flange 10, which has a raised circular central portion thereon and the part of said face surrounding said central portion slopes outwardly forming a frusto-conical surface and forming a shoulder with said central portion. A disk 11 of flaring or frusto-conical shape is centrally apertured to fit over said raised central portion of the flange and against said shoulder, said disk thus being centered on said bracket while being assembled. The lower end of an upright rim supporting member 13 terminates in a circular flange 12 of substantially the same diameter as the flange 10 and secured thereto by spaced circumferential bolts. The inner face of the flange 12 is formed to fit the outer face of the flange 10 and hence, has a central recess therein to receive the central projection on flange 10 and also has a surface surrounding said recess sloping outwardly at the same angle as the outer surface of the flange 10, thus forming a frustro-conical surface. The disk 11 has the same slope or angle, as the said frusto-conical surfaces on flanges 10 and 12 and is very firmly and rigidly clamped therebetween. This feature of the structure is very important and desirable. If the surfaces of the flanges 10 and 12 were made entirely flat or plane the central part of the disk 11 would have to be flattened or made plane and an extra operation would thus be necessitated, which operation is eliminated in the present structure. The member 13 at its outer end has an outwardly projecting flange having a curved surface adapted to engage and support the inner circumferential side of the rim member 14, which member as illustrated has secured thereon a tire 15 of the usual pneumatic type. The bar 16 which is illustrated as of ribbed or T-shape in cross section is provided with a central hub adapted to slide on a stem 17 carried by member 13 and projecting outwardly therefrom, which stem is threaded at its outer end. The outer ends of the arms 16 are formed with curved inner surfaces adapted to fit around and engage the outer edge of the rim member 14. The bar 16 is forced toward the disk 11 to clamp the rim by a nut member 18 screwed onto the threaded outer end of the stem 17. The outer end of the stem 17 is provided with a vertical slot of considerable depth and the nut 18 is provided with a pair of spaced ears at its upper side between which is pivoted a locking key member 19. Said nut is also provided with a vertical slot 20 into which the key member 19 is adapted to swing and when the slot 20 is brought into alinement with the slot in the end of the stem, the member 19 will also be disposed in the slot in the stem, as shown in Fig. 3. The key 19 is provided with a flat disk or cap portion 21 adapted to be disposed in front of the stem 17 and said member is also provided with a transverse aperture in its outer end adapted to aline when it is disposed in the nut 18 with an aperture 22 extending through ears in said nut which are disposed at each side of the slot 20. When the parts are so disposed, a lock member 23 can have its bail extending through the apertures in the key member and nut and be locked in position. The key member is made wide so as to engage in the stem with the nut in various positions.

In operation, the arm 16 and nut 18 will be removed from the stem 17 and the rim can then be placed in position with its inner circumferential side supported on the outer end of the member 13 and will engage against the edge of the disk 11. The bar 16 will now be placed on the stem and will engage the outer edge of the rim substantially at the ends of the horizontal diameter thereof, and this bar will be moved into firm engagement with the rim to press the same against the disk 11 by the nut 18, said nut being provided with a handle portion extending therefrom at one side. The nut 18 is then turned to a vertical position and the key member 19 swung into the slot in the nut and the end of stem 17 when the same can be locked in position. The rim is thus firmly clamped at widely spaced circumferential points and will be tightly held in position and firmly supported in the carrier. Owing to the locking mechanism the nut 18 can not work loose to allow the rim to become loose and the same is also very well protected against theft.

In the modification shown in Fig. 5, a bracket 24 adapted to be secured to the body of the vehicle is used and a disk 25 is placed thereon in the same manner as already described for the brackets 10. The disk 25 is adapted to engage the rim or tire at its outer edge and in the embodiment of the invention illustrated in Fig. 5 is shown as of sufficient diameter to engage the inner portion of the tire. A member 26 has a circular plate-like flange at its central portion which is bolted to the flange of bracket 24 and secures the disk 25 in position just as the disk 11 is secured in position. The member 26, however, has one or more pairs of arms extending radially therefrom, which, at their outer ends, are formed with flanges adapted to engage the interior of the rim member 14 and are also provided adjacent said flanges with hubs or lugs 27 which are bored to receive headed and nutted bolts 28 projecting outwardly therefrom. Clamping dogs or hooks 29 are provided with spaced lugs bored to fit and slide on the bolts 28 and are formed at their outer ends to fit and engage the curved outer edge of the rim.

In the operation of the modification described, the rim will be placed in position on the arms of the member 26 and will then be engaged by the members 29 and the nuts on bolts 28 tightened to firmly clamp the rim between the member 25 and the members 29, said rim being also supported on the member 26. The rim will thus be solidly and securely supported.

In Fig. 6, a modified form of the invention is illustrated, which is similar to that shown in Fig. 1 and already described, except that instead of the flat and slightly concave plate 11 being used, a plate 30 is provided which, at its central portion, is formed with a rearwardly projecting curved portion 31. With this structure, the rim and tire are moved somewhat closer to the bracket 10. The arms 13 and stem 17 and other parts are the same as shown in Fig. 1, the plate 30, however, being shown of sufficient diameter to contact the tire at its outer and beaded edge. In the structure shown in Fig. 6, as stated, the rim and tire occupy a position somewhat closer to the car and the length of the stem 17 can be somewhat reduced so that the carrier is of less extent longitudinally of the axis of the stem 17.

In Fig. 7, a further modified form of the invention is shown which is most similar to that shown in Fig. 5. A bracket 24 is used which may be attached to some part of the vehicle and a disk 25 is clamped between this bracket and a member 32 which has a central plate-like portion bolted to the flange on the bracket 25. The member 32 comprises arms extending in opposite directions, which have adjacent their outer ends lugs 34 thereon similar to the lugs 27 in Fig. 5, which lugs are bored to receive the bolts 28. The ends of the arms on member 32 are provided with outwardly extending flanges adapted to support the inner circumferential side of the rim and these arms are further provided outwardly of said flanges with extensions or heel portions 33, which extend a short distance around the inner edge of the rim. The bolts 28 support dogs or hook-like clamping members 29 similar to those shown in Fig. 5 which are moved against the rim by the nuts applied to the bolts 28. It is thought the operation of this modification will be clear from the description given of the previous modifications, particularly that of Fig. 5.

From the above description it is seen that applicant has provided a very simple and efficient form of rim and tire carrier. The supporting bracket can be modified to be attached to various parts of the automobile body. The parts of the device are comparatively few and the rim or the rim and tire can be very easily and quickly secured in or removed from the carrier. The parts are of simple construction, capable of quick assembling and are exceedingly durable. Said parts when made are provided with any suitable plating or finish to suit the finish of the automobile. The device has been used in actual practice and the efficiency thereof has been demonstrated in actual and commercial use.

It will, of course, be understood that various changes may be made in the form, details, arrangement and proportions of the parts without departing from the scope of applicant's invention, which, generally stated, consists in the matter shown and described and set forth in the appended claims.

What is claimed is:

1. A rim or wheel carrier having in combination a bracket adapted to be secured on a vehicle, said bracket comprising a supporting flange having a frustro-conical form, a disk-like plate having a frustro-conical inner edge concentrically arranged on said flange, and a clamping member having a frustro-conical positioning and supporting flange for securing said plate to said supporting flange, said clamping member carrying a central spindle for mounting rim or wheel clamping means cooperating with the outer rim of said plate.

2. A rim or wheel carrier having in combination a bracket adapted to be secured on a vehicle, said bracket comprising a supporting flange having a frustro-conical form, a disk-like plate having a frustro-conical inner edge concentrically arranged on said flange, and a clamping member having a frustro-conical positioning and supporting flange for securing said plate to said supporting flange, said clamping member carrying means for mounting rim or wheel supporting means cooperating with the outer rim of said plate.

3. A rim or wheel carrier having in combination a bracket adapted to be secured on a vehicle, said bracket comprising a supporting flange having a frustro-conical form, a disk-like plate having a frustro-conical inner edge concentrically arranged on said flange, and a clamping member having a frustro-conical positioning and supporting flange for securing said plate to said supporting flange, said clamping member carrying means for mounting rim or wheel supporting means.

4. In an automobile spare rim or spare wheel carirer, in combination, two arms, means to secure one of said arms to the automobile with the upper end of said arm substantially flush with the under side of the skirt-guard, independent means to secure the other arm to said first named arm with the skirt-guard therebetween, and means immovably to mount a spare wheel or rim upon said second arm.

5. An automobile tire carrier including, in combination, two arms each having a flange at one end, one arm being removably secured to the longitudinal side frame member of the automobile underneath the skirt-guard or apron with its flange against the underside of the apron, the other arm being mounted outside the apron with its flange adjacent the apron, and means passing through holes in the apron for holding the two arms together.

6. An automobile tire carrier including means for attachment to the longitudinal side frame member of the automobile, and means for supporting a spare rim or wheel in an upright position alongside said frame member, said means being on opposite sides of but not passing through the skirt-guard or apron which shields the side frame member, and joined together by bolts traversing the apron.

7. An automobile rim or wheel carrier, comprising a pair of brackets with end flanges provided with perforations for bolts, said brackets being juxtaposed end to end and secured together with the apron of the automobile therebetween, the flange at the extremity of one bracket providing a support for a spare rim or wheel and the flange at the opposite extremity of the other arm permitting the carrier to be secured to the frame of the automobile.

8. An automobile rim or wheel carrier, comprising means for attachment to the frame of the automobile, and means for supporting a spare rim or wheel in an upright position alongside said frame, said means being on opposite sides of but not passing through the apron or other part which shields the frame, and joined together by bolts traversing said apron or other part.

9. An automobile rim or wheel carrier, comprising two alining arms; means to secure one of said arms to the automobile with the upper end of said arm substantially flush with the underside of the apron or other part which shields the frame; and means to secure the other arm to said first named arm with its lower end flush with the upper side of said apron and with said apron or other part therebetween, said two arms being supplemental to the supports with which the apron is normally provided.

10. An automobile rim or wheel carrier, comprising two brackets; means to secure one of said brackets to the frame of the machine; means to support a rim or wheel upon the other of said brackets; and means to secure said brackets together with the apron of the automobile between the ends of said brackets, said two brackets being supplemental to the supports with which the apron is normally provided.

11. An automobile rim or wheel carrier, comprising two brackets, means to secure one of said brackets to the frame of the machine; means to support a rim or wheel upon one end of the other bracket; an arm extending from said other bracket; independent means to secure said brackets together with the apron of the automobile therebetween; and means to secure said arm to the frame of the machine.

12. An automobile rim or wheel carrier, comprising two brackets; means to secure one of said brackets to the frame of the machine; means to support a rim or wheel upon one end of the other bracket; an arm extending from said other bracket; means to secure said brackets together with the apron of the automobile therebetween; and means to secure said arm to the bracket that is secured to the machine frame.

13. An automobile rim or wheel carrier, comprising two brackets; means to secure one of said brackets to the frame of the machine; means to support a rim or wheel upon one end of the other bracket; an arm extending from said other bracket; independent means to secure said brackets together with the apron of the automobile therebetween; means to secure said arm to the frame of the machine; and means to space said arm from the machine frame.

14. An automobile rim or wheel carrier, comprising an exposed protection member, a concealed support behind said protection member, means for attaching said support to the frame of an automobile, a bracket at the outer side of said protection member, said support and bracket having flat, adjacent end faces and no interengaging part preventing lateral adjustment of one with respect to the other during the process of assembling same on the protection member, means independent of said bracket and support and attaching means to secure them together in desired relation with the protection member intervening between them, and rim or wheel supporting means on said bracket.

In testimony whereof I affix my signature.

EMIL R. DRAVER.